(12) United States Patent
Egger et al.

(10) Patent No.: US 10,965,158 B2
(45) Date of Patent: Mar. 30, 2021

(54) SYSTEM FOR NON-CONTACT TRANSMISSION OF ELECTRICAL ENERGY TO A MOBILE PART MOVABLY ARRANGED ON THE FLOOR OF A FACILITY

(71) Applicant: SEW-EURODRIVE GMBH & CO. KG, Bruchsal (DE)

(72) Inventors: Björn Egger, Bruchsal (DE);
Nils-Malte Jahn, Heidelberg (DE);
Andreas Böser, Bruchsal (DE); Jochen Mahlein, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 16/753,793

(22) PCT Filed: Sep. 26, 2018

(86) PCT No.: PCT/EP2018/025248
§ 371 (c)(1),
(2) Date: Apr. 5, 2020

(87) PCT Pub. No.: WO2019/068365
PCT Pub. Date: Apr. 11, 2019

(65) Prior Publication Data
US 2020/0259367 A1   Aug. 13, 2020

(30) Foreign Application Priority Data

Oct. 5, 2017  (DE) ...................... 10 2017 009 254.0

(51) Int. Cl.
*H01F 27/42* (2006.01)
*H01F 37/00* (2006.01)
(Continued)

(52) U.S. Cl.
CPC .............. *H02J 50/10* (2016.02); *H01F 38/14* (2013.01); *H02J 7/02* (2013.01); *H02J 50/005* (2020.01)

(58) Field of Classification Search
CPC . H02J 5/005; H02J 7/025; H02J 17/00; H01F 38/14; B60L 11/182
(Continued)

(56) References Cited

U.S. PATENT DOCUMENTS

2010/0224725 A1  9/2010  Perlman et al.
2014/0055089 A1  2/2014  Ichikawa et al.
(Continued)

FOREIGN PATENT DOCUMENTS

DE    102009057437 A1   6/2011
WO       201312556 A1   8/2013

*Primary Examiner* — Quan Tra
(74) *Attorney, Agent, or Firm* — Carter Deluca & Farrell LLP

(57) ABSTRACT

In a system for non-contact transmission of electrical energy to a mobile part movably arranged on a facility floor, a charge unit is situated in a recess of the floor, the charge unit has a receiving part having upper and lower cover parts, a primary winding is accommodated in the upper cover part, the receiving part at least partially restricts a space region that accommodates an electronic circuit, a bore penetrates the lower cover part, and terminates via its first end region in the space region and terminates via its other end region in a further space region which is at least partially restricted by a dome wall provided on the lower cover part, and a diaphragm is situated on the bore.

25 Claims, 2 Drawing Sheets

(51) Int. Cl.
*H01F 38/00* (2006.01)
*H02J 50/10* (2016.01)
*H02J 50/00* (2016.01)
*H01F 38/14* (2006.01)
*H02J 7/02* (2016.01)

(58) Field of Classification Search
USPC .......................................................... 307/104
See application file for complete search history.

(56) References Cited

U.S. PATENT DOCUMENTS

| | | |
|---|---|---|
| 2014/0361635 A1 | 12/2014 | Dokawa et al. |
| 2017/0001527 A1* | 1/2017 | Prokhorov .............. B60L 53/65 |
| 2017/0237295 A1* | 8/2017 | Yuasa ..................... H02J 5/005 |
| | | 307/104 |
| 2018/0170192 A1* | 6/2018 | Yuasa ..................... B60L 53/20 |
| 2019/0035543 A1* | 1/2019 | Suzuki ................... H01F 38/14 |

* cited by examiner

SYSTEM FOR NON-CONTACT TRANSMISSION OF ELECTRICAL ENERGY TO A MOBILE PART MOVABLY ARRANGED ON THE FLOOR OF A FACILITY

FIELD OF THE INVENTION

The present invention relates to a system for a non-contact transmission of electrical energy to a mobile part which is movably arranged on a floor of a facility.

BACKGROUND INFORMATION

German Published Patent Application No. 10 2009 057 437 describes that energy can be transmitted in a non-contact manner via inductive coupling.

U.S. Patent Application Publication No. 2017/0237295 describes a system for a non-contact transmission of electrical energy.

U.S. Patent Application Publication No. 2014/0361635 describes a system for a non-contact transmission of electrical energy.

PCT Patent Application Publication No. WO 2013/125556 describes a system for a non-contact transmission of electrical energy.

U.S. Patent Application Publication No. 2014/0055089 describes a system for a non-contact transmission of electrical energy.

U.S. Patent Application Publication No. 2010/0224725 describes a system for a non-contact transmission of energy to aviation objects.

SUMMARY

Example embodiments of the present invention provide greater protection for a system for the non-contact charging of a mobile part of a facility.

According to an example embodiment of the present invention, in a system is provided for the non-contact transmission of electrical energy to a mobile part which is movably arranged on the floor of a facility, a charge unit is situated in a recess of the floor, the charge unit has a receiving part on whose topside an upper cover part is situated and on whose underside a lower cover part is situated, a primary winding is accommodated in the upper cover part, in particular on the inner side of the upper cover part, the receiving part at least partially restricts a space region in which an electronic circuit is situated, a bore, which penetrates the lower cover part, terminates via its first end region in the space region and terminates via its other end region in a further space region which is at least partially restricted by a dome wall that is formed on the lower cover part and in particular projects from the lower cover part in a downward direction, and a diaphragm is situated at the bore.

This has the advantage that better protection against the entry of moisture into the region of the electronic circuit is ensured. Toward this end, the diaphragm is situated at the bore on the one hand, and a cap, which acts as a diving bell, is situated around the diaphragm on the other hand. Thus, protection is available even in the event of a rising groundwater level.

According to example embodiments, the charge unit includes a ring part which is placed on a step of the recess arranged as a stepped bore. This has the advantage that the charge unit is able to be provided in the floor. The ring part allows for a precise alignment of the charge unit so that the surface of the charge unit is able to be aligned with the driving surface, which thus allows for unobstructed driving over the charge unit.

According to example embodiments, the receiving unit is connected to the ring part with the aid of screws. This has the advantage of allowing for an uncomplicated and stable attachment. In addition, the receiving unit is able to be aligned at a centering edge of the ring part. In this context, it is important that the ring part is exactly aligned in the stepped bore introduced into the floor material before it is connected to the floor material, in particular screw-fitted with the aid of screws introduced into screw anchors or is integrally connected using casting compound.

According to example embodiments, the upper cover part is connected to the receiving part with the aid of screws and tightly connected by an interposed seal. This has the advantage that tight sealing of the space region is achievable, in particular, with regard to air pressure.

According to example embodiments, the space region is restricted and/or surrounded by the upper cover part, by the lower cover part and the receiving part, the space region, in particular, being sealed from the environment by the tight connection between the receiving part and the upper cover part as well as between the receiving part and the lower cover part. This has the advantage that the space region is situated in the charge unit sealed in a pressure-tight manner and the thermally induced air-pressure equalization is carried out only via the bore.

According to example embodiments, the diaphragm is semipermeable, in particular, impermeable to water and permeable to air. This has the advantage that an unobstructed air pressure equalization takes place by the diaphragm but no water permeability is achievable.

According to example embodiments, the diaphragm covers the second end region and/or is attached to the lower cover part. This has the advantage that the air exchange between the space region and the further space region takes place only by the diaphragm. As a result, the protection against the penetration of water into the space region is able to be ensured.

According to example embodiments, the dome wall around the diaphragm, the outlet opening of the bore toward the further space region, and/or the lower end region of the bore has/have a circumferential configuration. This offers the advantage that the dome wall is set apart from the diaphragm and the further space region may thus have large dimensions without the dome wall having to be given very long dimensions.

According to example embodiments, the diaphragm and/or the outlet opening of the bore is/are situated in the upper end region of the further space region. This has the advantage of achieving a maximum utilization of the protective function of the further space region.

According to example embodiments, the dome wall is integrally arranged with the lower cover part, in particular, in one part, especially from metal or plastic. This is considered advantageous insofar as the production is uncomplicated and it is easy to achieve tightness for the further space region.

According to example embodiments, the electronic circuit is has a power inverter whose terminal on the alternating voltage side is connected to the input side of a quadripole, in particular, a gyrator, and the output side of the quadripole feeds the primary winding, the quadripole, in particular, having components such as at least one inductivity and one capacitance, the components being resonantly adapted to the frequency of the alternating voltage supplied by the power inverter at its alternating-voltage side terminal. This offers the advantage that high efficiency is achievable in the inductive energy transmission even if the distance from the primary winding to the secondary winding is fluctuating.

According to example embodiments, a cable for the electrical supply of the electronic circuit is routed through an empty conduit installed in the floor material to a screwed cable gland situated on the lower cover part, in particular, so that the cable is routed in a sealed manner through the lower cover part into the space region. This has the advantage that the energy supply takes place with a high degree of protection.

According to example embodiments, casting compound is situated between the receiving part and the floor material. This has the advantage that it is more difficult for water to penetrate the stepped bore of the floor material.

According to example embodiments, the surface of the upper cover part is situated flush with the driving surface, i.e., the surface of the floor material, so that the mobile part is able to drive over the upper cover part. This is considered advantageous insofar as it is possible to drive over the charge unit. The upper cover part may be formed of plastic for this purpose.

Further features and aspects of example embodiments of the present invention are described in greater detail below with reference to the appended Figures.

DETAILED DESCRIPTION

Figure 1:
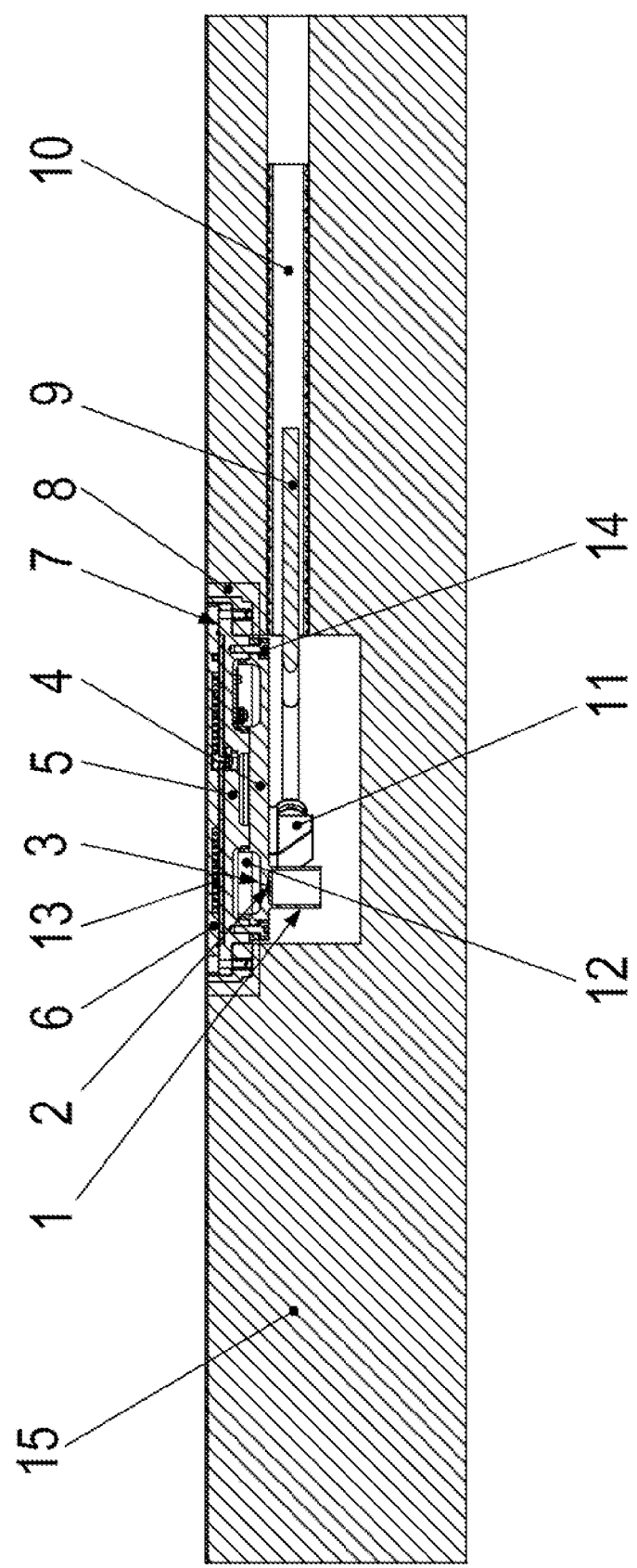
FIG. 1 is a schematic cross-sectional view through a system according to an example embodiment of the present invention.
Figure 2:
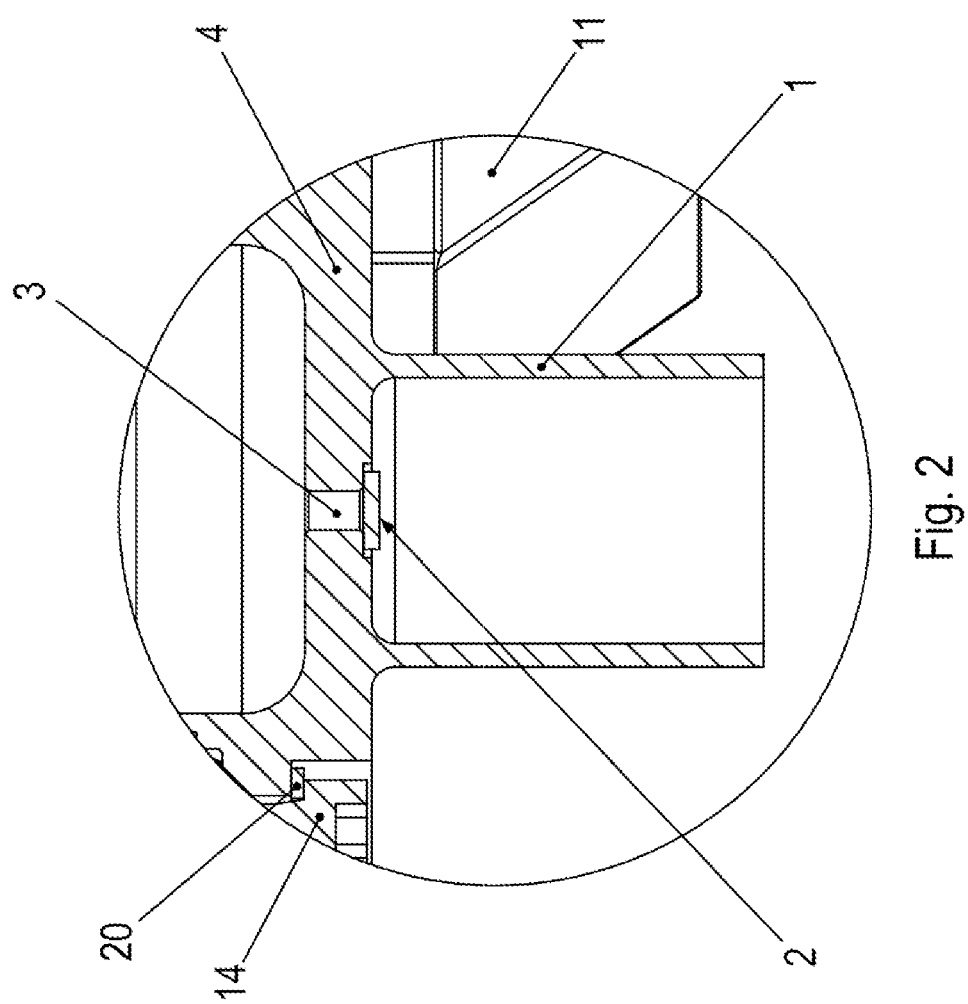
FIG. 2 is an enlarged view of the system illustrate in FIG. 1.

As schematically illustrated in the Figures, the floor of a facility has floor material 15 whose surface constitutes a driving surface for mobile parts.

A stepped bore is introduced into the floor, in which a primary part is accommodated which functions as a charge unit for the mobile part.

The mobile parts have a secondary winding on their undersides so that electrical energy is inductively transmittable to the mobile parts.

For this purpose, the primary part includes a receiving part 5 on the topside of which an upper cover part 6, in particular a plastic cover, with primary winding 13 is accommodated, and on the underside of which a lower cover part 4 is accommodated.

Primary winding 13 is inserted into grooves on the underside of the upper cover part that have a rectangular form or extend in the form of a circular spiral.

Upper cover part 6 is connected to receiving part 5 by screws and tightly connected to receiving part 5 with the aid of a seal, in particular a flat seal.

Lower cover part 4 is connected to receiving part 5 by screws 14 and likewise tightly connected to receiving part 5 with the aid of a second seal 20, in particular a flat seal.

A space region for accommodating electronics is provided in receiving part 5. Formed in the bottom region is a cable duct in which an empty conduit 10 is installed in which a cable 9 is routed to a screwed cable gland 11 situated on lower cover part 4. Cable 9 is able to be routed in a sealed manner through this screwed cable gland 11 and then through a recess in lower cover part 4 to space region 12. In this manner, the electronics is able to be supplied with electrical energy. The electronics may have a power inverter whose alternating-voltage side terminal feeds a gyrator whose capacitance and inductivity are adapted in terms of their resonance to the frequency of the alternating voltage at the alternating-voltage side terminal. As a result, it is possible to supply current from the gyrator as a current-source-type energy source to an oscillating circuit that includes the primary winding and a capacitance.

The oscillating circuit is dimensioned so that its resonant frequency is adapted to the frequency, i.e., is similar to the frequency.

The connecting wires of primary winding 13 are thus routed to the electronics situated in receiving part 5.

Disposed on the underside of lower cover part 4 is an uninterrupted bore which terminates in the space region. A semipermeable diaphragm is situated at the bore so that air is able to reach the space region through the bore or is able to exit the space region through the bore, but water may not. In other words, the diaphragm is permeable to air and impermeable to water, i.e., is hydrophobic.

The outlet of the bore situated on the underside of lower cover part 4 terminates in a space region that is surrounded by a dome region 1. This dome region 1 has a downward orientation. For this purpose, dome region 1 has a circumferential dome wall which projects from lower cover part 4 in the downward direction. The dome wall circles the outlet of the bore so that possibly occurring and rising ground water is able to rise only against the rise in an air pressure increase that is active in the space region surrounded by the dome region. In other words, when the water level rises outside dome region 1, a rise in the space region surrounded by the dome region is lower. Additional protection against the entry of water into the space region accommodated by the receiving part is also provided by diaphragm 2.

Excellent safety is achieved as a result.

The topside of upper cover part 6 is arranged flush with the surface of the floor region so that the mobile part is able to drive over the primary part.

At its outer circumference, receiving part 5 is connected to a ring which is placed on a step of the stepped bore introduced into the floor material.

The interspace between the primary part and the floor material is at least partially filled with casting compound 8.

If water has accumulated in the dome region and the temperature of the electronics rises, then the air volume in the space region and in the dome region expands. When the electronics cools, it contracts. This is so because the expanding air is flowing through diaphragm 2 in both direction without obstruction.

The dome wall is integrally formed with lower cover part 4, in particular from metal or plastic.

The diaphragm may cover the outlet of the bore.

"Below and/or underneath" in the previous description relates to the gravitational direction. Thus, the lower cover part is situated underneath the receiving part in the gravitational direction, and the upper cover part is situated above the receiving part, i.e., counter to the gravitational direction.

In further exemplary embodiments, an elastic envelope instead of the dome section is disposed on lower cover part 4 around the outlet of the bore. Even greater protection against the penetration of water is achieved in this manner since the material of the elastic envelope is impermeable to water and impermeable to air.

In further exemplary embodiments, capacitors are situated in the space region of the electronic circuit and/or on the inner side of lower cover part 4, which act as capacitances switched in parallel and/or switched in series with the primary winding and thereby form the oscillating circuit together with the primary winding. The capacitance is such that the resonant frequency of the oscillating circuit is similar to the frequency of the alternating voltage supplied at the alternating-voltage side terminal.

LIST OF REFERENCE NUMERALS 1 dome section
2 diaphragm, in particular semipermeable diaphragm
3 bore, in particular uninterrupted
4 lower cover part
5 receiving part
6 upper cover part, in particular plastic cover
7 first seal, in particular flat seal
8 casting compound
9 cable
10 empty conduit
11 screwed cable gland
12 space region
13 primary winding
14 screw
15 floor material
20 second seal

The invention claimed is:

1. A system for non-contact transmission of electrical energy to a mobile part movably arrangeable on a floor of a facility, comprising:
a charge unit adapted to be arranged in a recess of the floor, the charge unit including a receiver part, an upper cover part provided on an upper side of the receiver part, a lower cover part provided on an underside of the receiver part, a primary winding accommodated in the upper cover part, and a first space region accommodating an electronic circuit;
wherein the lower cover part includes a bore extending between the first space region at a first end region of the bore and a second space region at a second end region of the bore, the second space region including a dome wall on the lower cover part, a diaphragm being arranged at the bore.

2. The system according to claim 1, wherein the diaphragm is semipermeable.

3. The system according to claim 2, wherein the diaphragm is impermeable to water and permeable to air.

4. The system according to claim 1, wherein the primary winding is accommodated on an inner side of the upper cover part.

5. The system according to claim 1, wherein the bore extends downwardly between the first space region and the second space region.

6. The system according to claim 1, wherein the charge unit includes a ring part provided on a stepped bore of the recess.

7. The system according to claim 6, wherein the receiver part is screw-connected to the ring part.

8. The system according to claim 1, wherein the upper cover part is screw-connected to the receiver part and is includes an interposed seal.

9. The system according to claim 1, wherein at least one capacitor and/or compensation capacitor is provided in the first space region and/or on an inner side of the lower cover part.

10. The system according to claim 1, wherein the space region is restricted and/or surrounded by the upper cover part, by the lower cover part, and by the receiver part.

11. The system according to claim 10, wherein the space region is sealed from the environment by a connection between the receiver part and the upper cover part and between the receiver part and the lower cover part.

12. The system according to claim 1, wherein the diaphragm covers the second end region and/or is attached to the lower cover part.

13. The system according to claim 1, wherein the dome wall is circumferentially arranged around the diaphragm, an outlet opening of the bore toward the second space region, and/or a lower end region of the bore.

14. The system according to claim 1, wherein the diaphragm and/or an outlet opening of the bore is arranged at an upper end region of the second space region.

15. The system according to claim 1, wherein the dome wall is integral and/or a single piece with the lower cover part.

16. The system according to claim 15, wherein the dome wall and the lower cover part are formed of metal and/or plastic.

17. The system according to claim 1, wherein the electronic circuit includes a power inverter having an alternating-voltage side terminal connected to an input side of a quadripole, an output side of the quadripole adapted to feed the primary winding.

18. The system according to claim 17, wherein quadripole includes components resonantly adapted to a frequency of an alternating voltage supplied by the power inverter on the alternating-voltage-side terminal.

19. The system according to claim 18, wherein the components include an inductivity and a capacitance.

20. The system according to claim 17, wherein the quadripole includes a gyrator and/or a transformer.

21. The system according to claim 1, wherein a cable adapted for electrical supply of the electronic circuit is routable through an empty conduit installed in the floor to a screwed cable gland provided on the lower cover part, so that the cable is routed in a sealed manner through the lower cover part into the first space region.

22. The system according to claim 1, wherein the casting compound is providable between the receiver part and the floor.

23. The system according to claim 1, wherein a surface of the upper cover part is adapted to be disposed flush with a driving surface and/or a surface of the floor, so that the mobile part is driveable over the upper cover part.

24. A system for non-contact transmission of electrical energy to a mobile part movably arrangeable on a floor of a facility, comprising:
a charge unit adapted to be arranged in a recess of the floor, the charge unit including a receiver part, an upper cover part provided on an upper side of the receiver part, a lower cover part provided on an underside of the receiver part, a primary winding accommodated in the upper cover part, and a first space region accommodating an electronic circuit;
wherein the lower cover part includes a bore extending between the first space region at a first end region of the bore and a second space region at a second end region of the bore, the second space region including an elastic envelope surrounding an outlet opening of the bore on the lower cover part, a diaphragm being arranged at the bore.

25. A system for non-contact transmission of electrical energy to a mobile part movably arranged on a floor of a facility, comprising:

a charge unit arranged in a recess of the floor, the charge unit including a receiver part, an upper cover part provided on an upper side of the receiver part, a lower cover part provided on an underside of the receiver part, a primary winding accommodated in the upper cover part, and a first space region accommodating an electronic circuit;

wherein the lower cover part includes a bore extending between the first space region at a first end region of the bore and a second space region at a second end region of the bore, the second space region including a dome wall on the lower cover part and/or an elastic envelope surrounding an outlet opening of the bore on the lower cover part, a diaphragm being arranged at the bore.

* * * * *